March 27, 1928.                  1,664,333
D. G. TAYLOR
AIR CLEANER
Filed Oct. 26, 1926
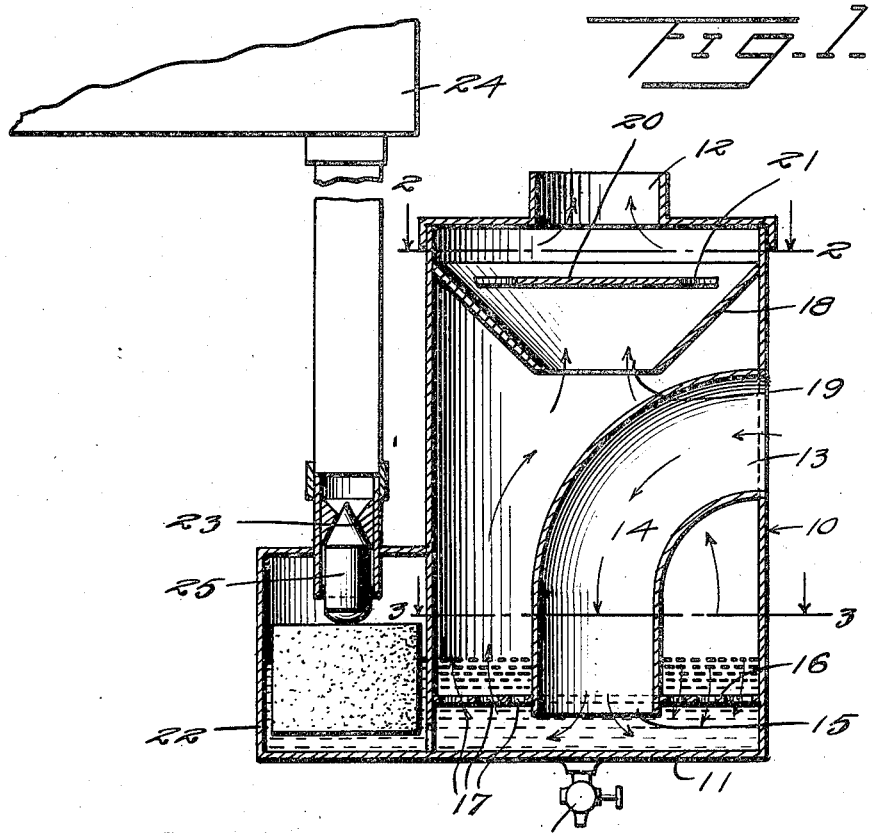
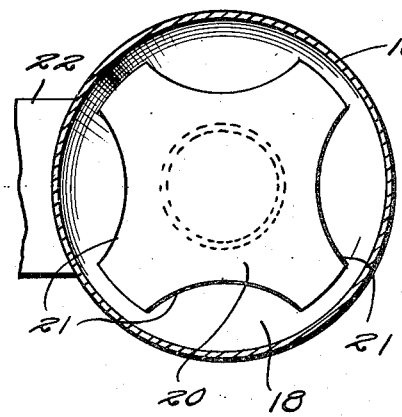
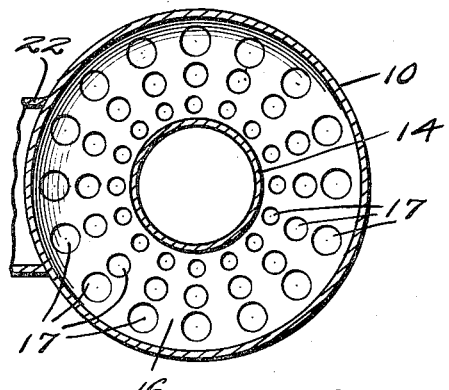
Inventor
D. G. Taylor
By Watson E. Coleman
Attorney Patented Mar. 27, 1928.

1,664,333

UNITED STATES PATENT OFFICE.

DOC G. TAYLOR, OF BAYTOWN, TEXAS.

AIR CLEANER.

Application filed October 26, 1926. Serial No. 144,369.

This invention relates to air cleaners and more particularly to an air cleaner especially adapted for use in conjunction with internal combustion engines for removing from air intaking at the carbureter particles of dirt and dust which might otherwise enter the engine and cause damage thereto.

An important object of the invention is to provide a device of this character which may be readily and cheaply constructed, which will be durable and efficient in service and which will require but little attention on the part of the operator.

These and other objects I attain by the construction shown in the accompanying drawing, wherein for the purpose of illustration is shown a preferred embodiment of my invention and wherein:—

Figure 1 is a vertical sectional view through an air cleaner constructed in accordance with my invention;

Figure 2 is a section on the line 2—2 of Figure 1;

Figure 3 is a section on the line 3—3 of Figure 1.

Referring now more particularly to the drawing, the numeral 10 indicates a container preferably cylindrical in form and having its lower end closed at 11. The upper end of the container is provided with an outlet 12, while the side wall of the container has an inlet 13 from which an inwardly and downwardly curving conduit 14 extends. The lower end 15 of this conduit is concentric with the container and is slightly spaced from the bottom of the container.

Surrounding the lower end 15 of the conduit and fitted thereto at its inner edge and to the inner surface of the wall of the container at its outer edge is a plate 16 having perforations 17 which are preferably graduated in size, the larger perforations being arranged adjacent the periphery of the plate, while the smaller perforations are arranged adjacent the inner edge thereof. In the upper end of the container above the conduit 14, a frusto-conical baffle 18 is arranged, this baffle having at its smaller end, which is downwardly disposed, an opening 19 for the passage of air. The larger upper end of the baffle 18 fits the wall of the container 10. Within the upper end of the baffle 18 is arranged a plate 20, the periphery of which is notched at 21, so that a space is provided for the passage of air between the walls of the baffle 18 and the bases of these notches. The central portion of this plate is imperforate and underlies the outlet opening 12 of the container.

Attached to the side wall of the container is a float chamber 22 communicating at its lower end with the lower end of the container 10. This float chamber has a check controlled inlet 23 which may be connected with a supply tank 24. The check valve 25 of this inlet is controlled by the float, so that a predetermined liquid level may be maintained within the container 10.

In operation, the outlet 12 is connected with the inlet of the carbureter of the engine with which it is to be employed (not shown). The suction created during operation of the engine will cause air to be drawn through the inlet 13 and conduit 14 and passed through water contained in the lower end of the container 10. The abrupt change of direction of the air current in passing through the water, together with the baffling action provided by the perforated plate 16 will cause any particles of dirt or grit contained in the air to be precipitated and come to rest upon the bottom of the tank. The cleansed air moistened by its contact with the water passes upwardly through the opening 19 and notches 21 to the outlet 12 and so to the carbureter. It will be obvious that the baffles 18 and 20 prevent the passage of large particles of water through the outlet 12 and will return this water to the bottom of the container. It is further pointed out that the lower end of the conduit 14 which is concentric with the opening 19 actually forms in itself a baffle increasing the sinuosity of the path through which the air must move in arriving at the outlet. The petcock P may be employed for drawing off soiled water from time to time.

Since the construction hereinbefore set forth is capable of a certain range of change and modification without materially departing from the spirit of the invention, I do not limit myself to such specific structure except as hereinafter claimed.

I claim:—

An air cleaner comprising a casing provided at its top side with an outlet opening, a screen located in the lower portion of the casing and spaced above the bottom thereof, the casing having an inlet opening located below the screen, an inlet pipe located in the casing and passing through the side thereof at a point above the screen and having an end portion passing through the intermediate portion of the screen, a frusto-conical baffle plate located in the casing above said pipe and having a bottom opening vertically alined with the lower end of said inlet pipe and a flat plate located in the frusto-conical baffle plate and provided at its edge with notches, the inner edges of which are located beyond the side edges of the outlet opening of the casing and the edges of the bottom opening in the frusto-conical baffle plate.

In testimony whereof I hereunto affix my signature.

DOC G. TAYLOR.